United States Patent
Dalal et al.

(10) Patent No.: US 9,348,638 B2
(45) Date of Patent: May 24, 2016

(54) OFFLOAD PROCESSOR MODULES FOR CONNECTION TO SYSTEM MEMORY, AND CORRESPONDING METHODS AND SYSTEMS

(71) Applicant: Xockets IP, LLC, Wilmington, DE (US)

(72) Inventors: Parin Bhadrik Dalal, Milpitas, CA (US); Stephen Paul Belair, Santa Cruz, CA (US)

(73) Assignee: Xockets, Inc., San Jose, CA (US)

( * ) Notice: Subject to any disclaimer, the term of this patent is extended or adjusted under 35 U.S.C. 154(b) by 260 days.

(21) Appl. No.: 13/913,410

(22) Filed: Jun. 8, 2013

(65) Prior Publication Data

US 2014/0201417 A1 Jul. 17, 2014

Related U.S. Application Data

(60) Provisional application No. 61/753,892, filed on Jan. 17, 2013, provisional application No. 61/753,895, filed on Jan. 17, 2013, provisional application No. 61/753,899, filed on Jan. 17, 2013, provisional (Continued)

(51) Int. Cl.
*G06F 13/36* (2006.01)
*G06F 9/46* (2006.01)
*H04L 12/801* (2013.01)
*G06F 13/16* (2006.01)

(Continued)

(52) U.S. Cl.
CPC .............. *G06F 9/461* (2013.01); *G06F 9/4843* (2013.01); *G06F 12/0815* (2013.01); *G06F 12/0875* (2013.01); *G06F 13/16* (2013.01); *G06F 13/362* (2013.01); *H04L 47/193* (2013.01); *H04L 47/2441* (2013.01); *H04L 47/56* (2013.01); *H04L 47/624* (2013.01); *H04L 47/6295* (2013.01); *H04L 49/90* (2013.01)

(58) Field of Classification Search
CPC ........................................................ G06F 13/16
USPC ................................................. 710/306–315
See application file for complete search history.

(56) References Cited

U.S. PATENT DOCUMENTS 4,894,768 A * 1/1990 Iwasaki et al. .................. 712/34
5,237,662 A 8/1993 Green et al.

(Continued)

FOREIGN PATENT DOCUMENTS

WO 2011120019 A2 9/2011
WO 2012141694 A1 10/2012

OTHER PUBLICATIONS

A.C. Verschueren, M. Verhappen, B.D. Theelen, M.P.J. Stevens, Arbitration in a multi-processor to multi-coprocessor connection switch, in: J.P. Veen (Ed.), Proceedings of ProRISC'99, Mierlo, The Netherlands, Nov. 24-26, STW Technology Foundation, Utrecht, The Netherlands, 1999, pp. 563-568.*

(Continued)

*Primary Examiner* — Raymond Phan

(57) ABSTRACT

A system can include a host processor connected to memory via a system memory bus; and at least one offload processor module, including at least one offload processor mounted on the offload processor module, and configured to execute operations on data received over the system memory bus, and to output context data to memory, and read context data from the memory, and hardware scheduling logic mounted on the module and configured to control operations of the at least one offload processor.

20 Claims, 8 Drawing Sheets

Related U.S. Application Data application No. 61/753,901, filed on Jan. 17, 2013, provisional application No. 61/753,903, filed on Jan. 17, 2013, provisional application No. 61/753,904, filed on Jan. 17, 2013, provisional application No. 61/753,906, filed on Jan. 17, 2013, provisional application No. 61/753,907, filed on Jan. 17, 2013, provisional application No. 61/753,910, filed on Jan. 17, 2013.

(51) Int. Cl.
| | |
|---|---|
| *G06F 9/48* | (2006.01) |
| *G06F 12/08* | (2016.01) |
| *G06F 13/362* | (2006.01) |
| *H04L 12/875* | (2013.01) |
| *H04L 12/863* | (2013.01) |
| *H04L 12/861* | (2013.01) |
| *H04L 12/851* | (2013.01) |

(56) References Cited

U.S. PATENT DOCUMENTS

| | | | |
|---|---|---|---|
| 5,247,675 A | 9/1993 | Farrell et al. | |
| 5,577,213 A | 11/1996 | Avery et al. | |
| 5,870,350 A | 2/1999 | Bertin et al. | |
| 6,092,146 A | 7/2000 | Dell et al. | |
| 6,157,955 A | 12/2000 | Narad et al. | |
| 6,330,658 B1 | 12/2001 | Evoy et al. | |
| 6,751,113 B2 | 6/2004 | Bhakta et al. | |
| 6,810,442 B1 | 10/2004 | Lin et al. | |
| 6,873,534 B2 | 3/2005 | Bhakta et al. | |
| 6,877,076 B1 | 4/2005 | Cho et al. | |
| 6,930,900 B2 | 8/2005 | Bhakta et al. | |
| 6,930,903 B2 | 8/2005 | Bhakta et al. | |
| 7,062,618 B2 | 6/2006 | Tsunoda et al. | |
| 7,089,412 B2 | 8/2006 | Chen et al. | |
| 7,254,036 B2 | 8/2007 | Pauley et al. | |
| 7,286,436 B2 | 10/2007 | Bhakta et al. | |
| 7,289,386 B2 | 10/2007 | Bhakta et al. | |
| 7,305,574 B2 | 12/2007 | Ferraiolo et al. | |
| 7,375,970 B2 | 5/2008 | Pauley et al. | |
| 7,421,552 B2 | 9/2008 | Long | |
| 7,421,694 B2* | 9/2008 | Gosalia et al. | 718/104 |
| 7,442,050 B1 | 10/2008 | Bhakta et al. | |
| 7,454,749 B2 | 11/2008 | Oberdorfer | |
| 7,467,251 B2 | 12/2008 | Park et al. | |
| 7,472,205 B2 | 12/2008 | Abe | |
| 7,480,611 B2 | 1/2009 | Gooding et al. | |
| 7,532,537 B2 | 5/2009 | Solomon et al. | |
| 7,565,461 B2* | 7/2009 | Huppenthal et al. | 710/22 |
| 7,619,893 B1 | 11/2009 | Yu | |
| 7,619,912 B2 | 11/2009 | Bhakta et al. | |
| 7,636,274 B2 | 12/2009 | Solomon et al. | |
| 7,716,035 B2 | 5/2010 | Oshins et al. | |
| 7,716,411 B2 | 5/2010 | Panabaker et al. | |
| 7,811,097 B1 | 10/2010 | Bhakta et al. | |
| 7,839,645 B2 | 11/2010 | Pauley et al. | |
| 7,840,748 B2 | 11/2010 | Gower et al. | |
| 7,864,627 B2 | 1/2011 | Bhakta et al. | |
| 7,881,150 B2 | 2/2011 | Solomon et al. | |
| 7,886,103 B2* | 2/2011 | Nishtala et al. | 710/301 |
| 7,904,688 B1 | 3/2011 | Kuo et al. | |
| 7,916,574 B1 | 3/2011 | Solomon et al. | |
| 8,001,434 B1 | 8/2011 | Lee et al. | |
| 8,033,836 B1 | 10/2011 | Bhakta et al. | |
| 8,054,832 B1 | 11/2011 | Shukla et al. | |
| 8,072,837 B1 | 12/2011 | Solomon et al. | |
| 8,081,535 B2 | 12/2011 | Bhakta et al. | |
| 8,081,536 B1 | 12/2011 | Solomon et al. | |
| 8,081,537 B1 | 12/2011 | Bhakta et al. | |
| 8,117,369 B2 | 2/2012 | Nishtala et al. | |
| 8,154,901 B1 | 4/2012 | Lee et al. | |
| 8,190,699 B2 | 5/2012 | Mcmillian et al. | |
| 8,264,903 B1 | 9/2012 | Lee et al. | |
| 8,287,291 B1 | 10/2012 | Bhakta et al. | |
| 8,301,833 B1 | 10/2012 | Chen et al. | |
| 8,347,005 B2 | 1/2013 | Bresniker | |
| 8,359,501 B1 | 1/2013 | Lee et al. | |
| 8,417,870 B2 | 4/2013 | Lee et al. | |
| 8,447,957 B1* | 5/2013 | Carrillo et al. | 712/225 |
| 8,489,837 B1 | 7/2013 | Lee | |
| 8,516,185 B2 | 8/2013 | Lee et al. | |
| 8,516,187 B2 | 8/2013 | Chen et al. | |
| 8,516,188 B1 | 8/2013 | Solomon et al. | |
| 8,553,470 B2 | 10/2013 | Lee et al. | |
| 8,555,002 B2 | 10/2013 | Karamcheti et al. | |
| 8,599,634 B1 | 12/2013 | Lee et al. | |
| 8,631,193 B2 | 1/2014 | Smith et al. | |
| 8,656,072 B2 | 2/2014 | Hinkle et al. | |
| 8,689,064 B1 | 4/2014 | Lee et al. | |
| 8,756,364 B1 | 6/2014 | Bhakta et al. | |
| 8,775,858 B2 | 7/2014 | Gower et al. | |
| 8,782,350 B2 | 7/2014 | Lee et al. | |
| 8,782,373 B2 | 7/2014 | Karamcheti et al. | |
| 8,787,060 B2 | 7/2014 | Lee | |
| 8,864,500 B1 | 10/2014 | Bhakta et al. | |
| 8,868,829 B2 | 10/2014 | Rajan et al. | |
| 8,874,831 B2 | 10/2014 | Lee et al. | |
| 8,874,843 B2 | 10/2014 | Okin et al. | |
| 8,881,389 B2 | 11/2014 | Kanapathippillai et al. | |
| 8,904,098 B2 | 12/2014 | Amidi et al. | |
| 8,924,680 B2 | 12/2014 | Perego et al. | |
| 8,930,647 B1 | 1/2015 | Smith | |
| 8,943,245 B2 | 1/2015 | Karamcheti et al. | |
| 2002/0107971 A1* | 8/2002 | Bailey et al. | 709/231 |
| 2002/0181450 A1 | 12/2002 | Sokol et al. | |
| 2004/0093477 A1 | 5/2004 | Oberdorfer | |
| 2004/0148420 A1 | 7/2004 | Hinshaw et al. | |
| 2004/0160446 A1* | 8/2004 | Gosalia et al. | 345/503 |
| 2004/0187122 A1* | 9/2004 | Gosalia et al. | 718/100 |
| 2004/0202319 A1 | 10/2004 | Hussain et al. | |
| 2005/0018495 A1 | 1/2005 | Bhakta et al. | |
| 2005/0120160 A1 | 6/2005 | Plouffe et al. | |
| 2005/0226238 A1 | 10/2005 | Hoskote et al. | |
| 2005/0240745 A1 | 10/2005 | Iyer et al. | |
| 2005/0283546 A1* | 12/2005 | Huppenthal et al. | 710/36 |
| 2006/0004965 A1 | 1/2006 | Tu et al. | |
| 2007/0038839 A1* | 2/2007 | Hummel et al. | 711/207 |
| 2007/0038843 A1* | 2/2007 | Trivedi et al. | 712/34 |
| 2007/0079185 A1 | 4/2007 | Totolos | |
| 2007/0124532 A1 | 5/2007 | Bennett et al. | |
| 2007/0150671 A1* | 6/2007 | Kurland | 711/154 |
| 2007/0226745 A1 | 9/2007 | Haas et al. | |
| 2007/0255776 A1* | 11/2007 | Iwai | 708/200 |
| 2007/0299990 A1 | 12/2007 | Ben-yehuda et al. | |
| 2008/0040551 A1 | 2/2008 | Gray et al. | |
| 2008/0229049 A1 | 9/2008 | Nanda et al. | |
| 2008/0259555 A1 | 10/2008 | Bechtolsheim et al. | |
| 2008/0304481 A1 | 12/2008 | Gurney et al. | |
| 2009/0138440 A1 | 5/2009 | Goyal | |
| 2009/0187713 A1 | 7/2009 | Zedlewski et al. | |
| 2009/0201711 A1 | 8/2009 | Solomon et al. | |
| 2010/0064099 A1* | 3/2010 | Nishtala et al. | 711/105 |
| 2010/0091540 A1 | 4/2010 | Bhakta et al. | |
| 2010/0110642 A1 | 5/2010 | Pauley et al. | |
| 2010/0128507 A1 | 5/2010 | Solomon et al. | |
| 2010/0153686 A1* | 6/2010 | Frank | 712/34 |
| 2010/0183033 A1 | 7/2010 | Hannuksela | |
| 2011/0016250 A1 | 1/2011 | Lee et al. | |
| 2011/0022818 A1 | 1/2011 | Kegel et al. | |
| 2011/0085406 A1 | 4/2011 | Solomon et al. | |
| 2011/0090749 A1 | 4/2011 | Bhakta et al. | |
| 2011/0099317 A1* | 4/2011 | Nishtala et al. | 710/316 |
| 2011/0110376 A1 | 5/2011 | Jiang | |
| 2011/0154318 A1 | 6/2011 | Oshins et al. | |
| 2011/0202679 A1 | 8/2011 | Cohen et al. | |
| 2011/0211444 A1 | 9/2011 | Das et al. | |
| 2011/0235260 A1 | 9/2011 | Lee et al. | |
| 2011/0296440 A1 | 12/2011 | Laurich et al. | |
| 2012/0027018 A1 | 2/2012 | Ilyadis | |
| 2012/0047126 A1 | 2/2012 | Branscome et al. | |
| 2012/0079209 A1 | 3/2012 | Zhou et al. | |

(56) References Cited

U.S. PATENT DOCUMENTS

| | | | |
|---|---|---|---|
| 2012/0079352 | A1 | 3/2012 | Frost et al. |
| 2012/0106228 | A1 | 5/2012 | Lee |
| 2012/0239874 | A1 | 9/2012 | Lee et al. |
| 2012/0250386 | A1 | 10/2012 | Lee et al. |
| 2012/0250682 | A1 | 10/2012 | Vincent et al. |
| 2012/0271990 | A1 | 10/2012 | Chen et al. |
| 2012/0331268 | A1 | 12/2012 | Konig et al. |
| 2013/0003556 | A1 | 1/2013 | Boden et al. |
| 2013/0019057 | A1 | 1/2013 | Stephens et al. |
| 2013/0019076 | A1 | 1/2013 | Amidi et al. |
| 2013/0039128 | A1 | 2/2013 | Amidi et al. |
| 2013/0086309 | A1 | 4/2013 | Lee et al. |
| 2013/0132639 | A1 | 5/2013 | Amidi et al. |
| 2013/0262739 | A1 | 10/2013 | Bennett et al. |
| 2014/0040568 | A1 | 2/2014 | Lee et al. |
| 2014/0040569 | A1 | 2/2014 | Solomon et al. |
| 2014/0075106 | A1 | 3/2014 | Okin et al. |
| 2014/0204099 | A1* | 7/2014 | Ye .................................. 345/503 |
| 2014/0281661 | A1 | 9/2014 | Milton et al. |
| 2014/0337539 | A1 | 11/2014 | Lee et al. |
| 2015/0070959 | A1 | 3/2015 | Lee |

OTHER PUBLICATIONS

PCT International Search Report for International Application PCT/US2013/047217, dated Jan. 29, 2014.
PCT Written Opinion of the International Search Authority for International Application PCT/US2013/047217, dated Jan. 29, 2014.
PCT International Search Report for International Application PCT/US2013/046417, dated Dec. 23, 2013.
PCT Written Opinion of the International Search Authority for International Application PCT/US2013/046417, dated Dec. 23, 2013.
PCT International Search Report for International Application PCT/US2013/044856, dated Feb. 10, 2014.
PCT Written Opinion of the International Search Authority for International Application PCT/US2013/044856, dated Feb. 10, 2014.
PCT International Search Report for International Application PCT/US2013/044857, dated Feb. 10, 2014.
PCT Written Opinion of the International Search Authority for International Application PCT/US2013/044857, dated Feb. 10, 2014.
PCT International Search Report for International Application PCT/US2013/048013, dated Jan. 17, 2014.
PCT Written Opinion of the International Search Authority for International Application PCT/US2013/048013, dated Jan. 17, 2014.
PCT International Search Report for International Application PCT/US2013/042284, dated Nov. 26, 2013.
PCT Written Opinion of the International Search Authority for International Application PCT/US2013/042284, dated Nov. 26, 2013.
PCT International Search Report for International Application PCT/US2013/042279, dated Jan. 22, 2014.
PCT Written Opinion of the International Search Authority for International Application PCT/US2013/042279, dated Jan. 22, 2014.
PCT International Search Report for International Application PCT/US2013/042274, dated Dec. 6, 2013.
PCT Written Opinion of the International Search Authority for International Application PCT/US2013/042274, dated Dec. 6, 2013.
PCT International Search Report for International Application PCT/US2013/047205, dated Sep. 24, 2013.
PCT Written Opinion of the International Search Authority for International Application PCT/US2013/047205, dated Sep. 24, 2013.
Office Action, dated Apr. 15, 2015, for U.S. Appl. No. 13/899,563.
Office Action, dated May 4, 2015, for U.S. Appl. No. 13/913,407.
Office Action, dated May 21, 2015, for U.S. Appl. No. 13/913,409.
Office Action, dated May 21, 2015, for U.S. Appl. No. 13/913,410.
Office Action, dated Jun. 5, 2015, for U.S. Appl. No. 13/913,411.
Office Action, dated Jul. 8, 2015, for U.S. Appl. No. 13/900,241.
Office Action, dated May 21, 2015, for U.S. Appl. No. 13/900,262.
Office Action, dated May 22, 2015, for U.S. Appl. No. 13/900,273.

* cited by examiner

OFFLOAD PROCESSOR MODULES FOR CONNECTION TO SYSTEM MEMORY, AND CORRESPONDING METHODS AND SYSTEMS

PRIORITY CLAIMS

This application claims the benefit of U.S. Provisional Patent Applications 61/753,892 filed on Jan. 17, 2013, 61/753,895 filed on Jan. 17, 2013, 61/753,899 filed on Jan. 17, 2013, 61/753,901 filed on Jan. 17, 2013, 61/753,903 filed on Jan. 17, 2013, 61/753,904 filed on Jan. 17, 2013, 61/753,906 filed on Jan. 17, 2013, 61/753,907 filed on Jan. 17, 2013, and 61/753,910 filed on Jan. 17, 2013, the contents all of which are incorporated by reference herein.

TECHNICAL FIELD

The present invention relates generally to processing modules, and more particularly to offload processing modules that can be physically connected to a system memory bus to process data independent of a host processor of the system.

BACKGROUND

Enterprises often rely on input/output (IO) intensive networked applications running on dedicated servers that support associated "state", context or session-defined applications. Servers can run multiple applications, each associated with a specific state running on the server. Common server applications include an Apache web server, a MySQL database application, PHP hypertext preprocessing, video or audio processing with Kaltura supported software, packet filters, application cache, management and application switches, accounting, analytics, and logging.

Unfortunately, servers can be limited by computational and memory storage costs associated with switching between applications. When multiple applications are constantly required to be available, the overhead associated with storing the session state of each application can result in poor performance due to constant switching between applications. Dividing applications between multiple processor cores can help alleviate the application switching problem, but does not eliminate it. Advanced processors often only have eight to sixteen cores, while hundreds of application or session states may be required.

Enterprises also store and process their large amounts of data in a variety of ways. One manner in which enterprises store data is by using relational databases and corresponding relational database management systems (RDBMS). Such data, usually referred to as structured data, may be collected, normalized, formatted and stored in an RDBMS. Tools based on standardized data languages such as the Structured Query Language (SQL) may be used for accessing and processing structured data. However, it is estimated that such formatted structured data represents only a tiny fraction of an enterprise's stored data. All organizations are becoming increasingly aware that substantial information and knowledge resides in unstructured data (i.e. "Big Data") repositories. Accordingly, simple and effective access to both structured and unstructured data are seen as necessary for maximizing the value of enterprise informational resources.

However, the platforms that are currently being used to handle structured and unstructured data substantially differ in their architecture. In-memory processing and Storage Area Network (SAN)-like architecture are used for traditional SQL queries, while commodity or shared nothing architectures (each computing node, consisting of a processor, local memory, and disk resources, shares nothing with other nodes in the computing cluster) are usually used for processing unstructured data.

A computing system architecture, hardware, and operational method that supports input-output (IO) intensive networked applications, as well as structured and unstructured data queries is needed. Such a system needs to readily handle high throughput data processing, be able to provide high parallelism for dividing tasks among multiple processors, and further provide efficient context switching to support multiple users or applications.

BRIEF DESCRIPTION OF THE DRAWINGS

FIG. 1-1 shows a system flow according to an embodiment.
FIGS. 2-0 to 2-3 show processor modules according to various embodiments.
FIG. 2-4 shows a conventional dual-in-line memory module.
FIG. 2-5 shows a system according to another embodiment.
FIGS. 2-6 to 2-11 show processor module operations according to an embodiment.
FIG. 2-12 shows a method according to an embodiment.
FIG. 2-13 shows a method according to another embodiment.
FIG. 3 shows protocol stacks for processors according to embodiments.
FIG. 4 shows a partitioning of system loads according to an embodiment.
FIG. 5 shows a partitioning of system loads according to another embodiment.
FIG. 6 shows a method according to another embodiment.

DETAILED DESCRIPTION

Various embodiments of the present invention will now be described in detail with reference to a number of drawings. The embodiments show processing modules, systems, and methods in which offload processors are included on offload modules that connect to a system memory bus. Such offload processors are in addition to any host processors connected to the system memory bus, and can operate on data transferred over the system memory bus independent of any host processors. In particular embodiments, offload processors have access to a low latency memory, which can enable rapid storage and retrieval of context data for rapid context switching. In very particular embodiments, processing modules can populate physical slots for connecting in-line memory modules (e.g., DIMMs) to a system memory bus.

In some embodiments, computing tasks can be automatically executed by offload processors according to data embedded within write data received over the system memory bus. In particular embodiments, such write data can include a "metadata" portion that identifies how the write data is to be processed.

Figures 0, 1:
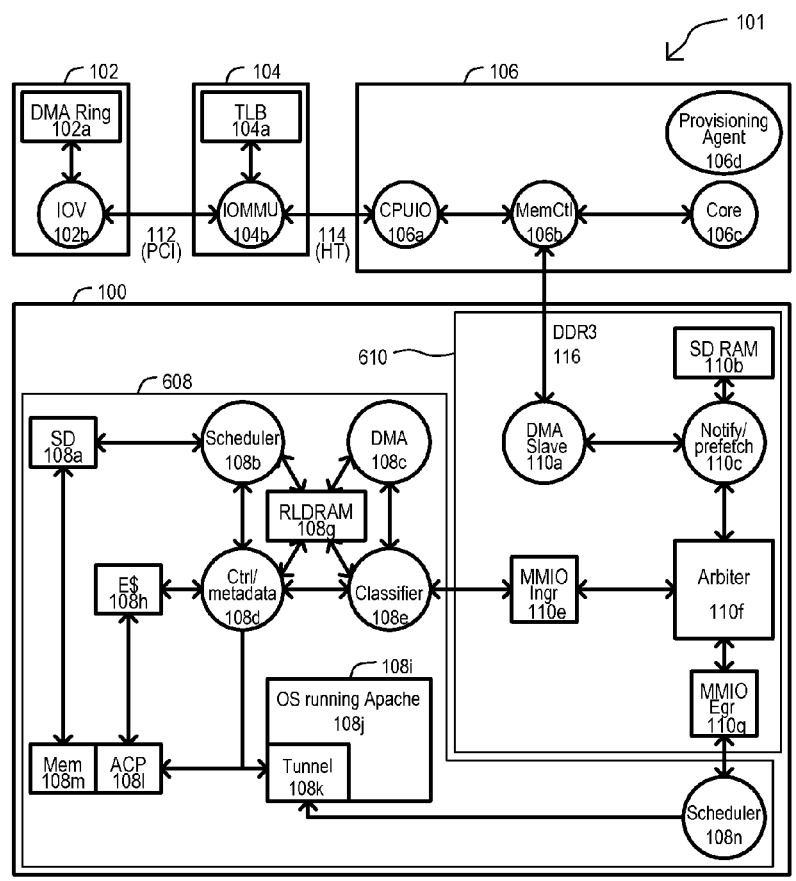
FIG. 1-0 shows a system according to an embodiment.
Figure 1:
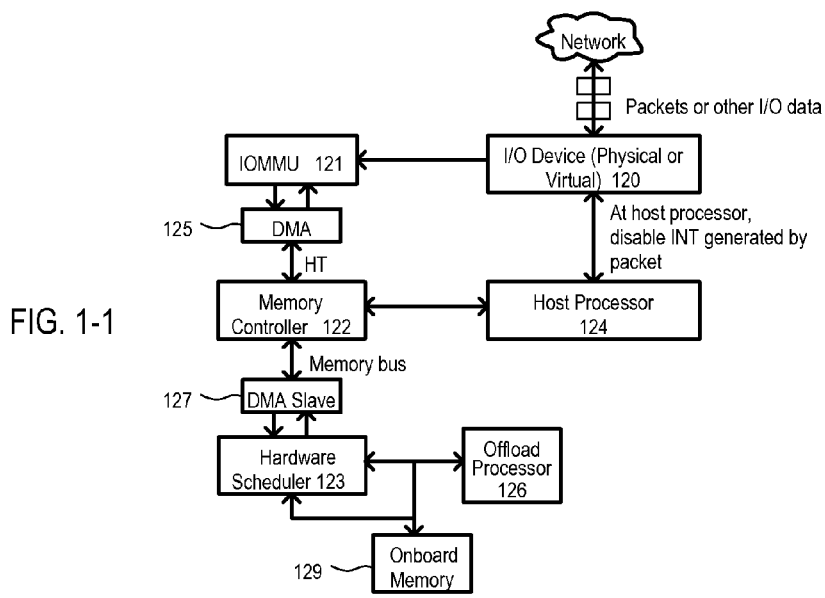
Figures 0, 2:
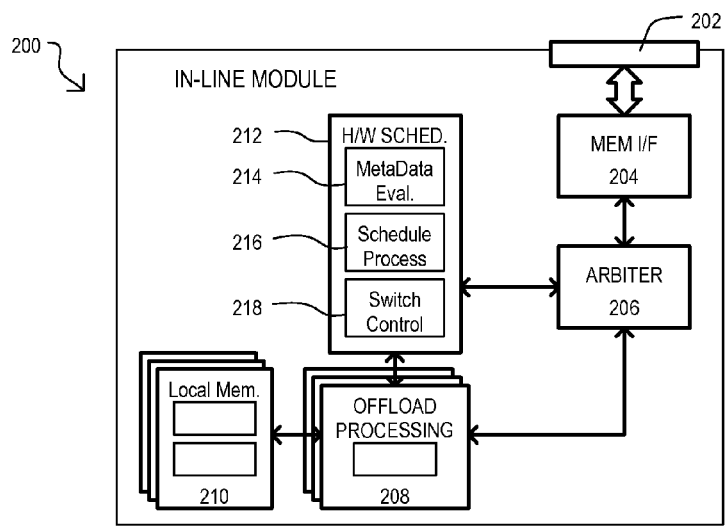
Figures 1, 2:
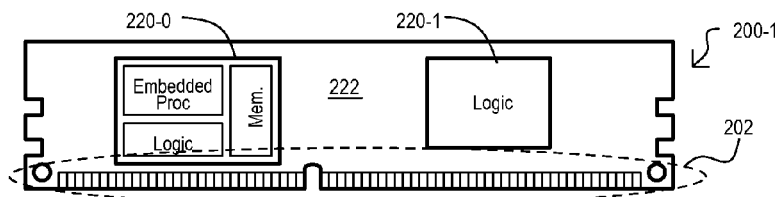
Figure 2:
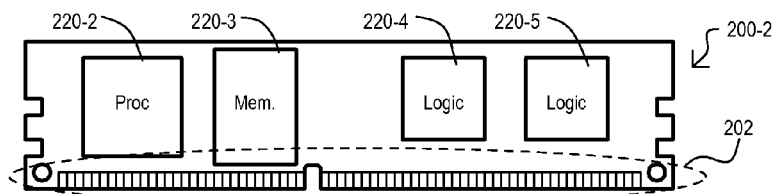

FIG. 2-0 is a block diagram of a processing module 200 according to one embodiment. A processing module 200 can include a physical in-line module connector 202, a memory interface 204, arbiter logic 206, offload processor(s) 208, local memory 210, and control logic 212. A connector 202 can provide a physical connection to system memory bus. This is in contrast to a host processor which can access a system memory bus via a memory controller, or the like. In very particular embodiments, a connector 202 can be compatible with a dual in-line memory module (DIMM) slot of a computing system. Accordingly, a system including multiple DIMM slots can be populated with one or more processing modules 200, or a mix of processing modules and DIMM modules.

A memory interface 204 can detect data transfers on a system memory bus, and in appropriate cases, enable write data to be stored in the processing module 200 and/or read data to be read out from the processing module 200. In some embodiments, a memory interface 204 can be a slave interface, thus data transfers are controlled by a master device separate from the processing module. In very particular embodiments, a memory interface 204 can be a direct memory access (DMA) slave, to accommodate DMA transfers over a system memory initiated by a DMA master. Such a DMA master can be a device different from a host processor. In such configurations, processing module 200 can receive data for processing (e.g., DMA write), and transfer processed data out (e.g., DMA read) without consuming host processor resources.

Arbiter logic 206 can arbitrate between conflicting accesses of data within processing module 200. In some embodiments, arbiter logic 206 can arbitrate between accesses by offload processor 208 and accesses external to the processor module 200. It is understood that a processing module 200 can include multiple locations that are operated on at the same time. It is understood that accesses arbitrated by arbiter logic 206 can include accesses to physical system memory space occupied by the processor module 200, as well as accesses to resources (e.g., processor resources). Accordingly, arbitration rules for arbiter logic 206 can vary according to application. In some embodiments, such arbitration rules are fixed for a given processor module 200. In such cases, different applications can be accommodated by switching out different processing modules. However, in alternate embodiments, such arbitration rules can be configurable.

Offload processor 208 can include one or more processors that can operate on data transferred over the system memory bus. In some embodiments, offload processors can run a general operating system which can run an application, such as Apache (as but one very particular example), enabling processor contexts to be saved and retrieved. Computing tasks executed by offload processor 208 can be handled by the hardware scheduler. Offload processors 208 can operate on data buffered in the processor module 200. In addition or alternatively, offload processors 208 can access data stored elsewhere in a system memory space. In some embodiments, offload processors 208 can include a cache memory configured to store context information. An offload processor 208 can include multiple cores or one core.

A processor module 200 can be included in a system having a host processor (not shown). In some embodiments, offload processors 208 can be a different type of processor as compared to the host processor. In particular embodiments, offload processors 208 can consume less power and/or have less computing power than a host processor. In very particular embodiments, offload processors 208 can be "wimpy" core processors, while a host processor can be a "brawny" core processor. In alternate embodiments, offload processors 208 can have equivalent computing power to any host processor. In very particular embodiments, a host processor can be an x86 type processor, while an offload processor 208 can include an ARM, ARC, Tensilica, MIPS, Strong/ARM, or RISC type processor, as but a few examples.

Local memory 210 can be connected to offload processor 208 to enable the storing of context information. Accordingly, an offload processor 208 can store current context information, and then switch to a new computing task, then subsequently retrieve the context information to resume the prior task. In very particular embodiments, local memory 210 can be a low latency memory with respect to other memories in a system. In some embodiments, storing of context information can include copying an offload processor 208 cache.

In some embodiments, a same space within local memory 210 is accessible by multiple offload processors 208 of the same type. In this way, a context stored by one offload processor can be resumed by a different offload processor.

Control logic 212 can control processing tasks executed by offload processor(s). In some embodiments, control logic 212 can be considered a hardware scheduler that can be conceptualized as including a data evaluator 214, scheduler 216 and a switch controller 218. A data evaluator 214 can extract "metadata" from write data transferred over a system memory bus. "Metadata", as used herein, can be any information embedded at one or more predetermined locations of a block of write data that indicates processing to be performed on all or a portion of the block of write data and/or indicate a particular task/process to which the data belongs (e.g., classification data). In some embodiments, metadata can be data that indicates a higher level organization for the block of write data. As but one very particular embodiment, metadata can be header information of one or more network packets (which may or may not be encapsulated within a higher layer packet structure).

A scheduler 216 can order computing tasks for offload processor(s) 208. In some embodiments, scheduler 216 can generate a schedule that is continually updated as write data for processing is received. In very particular embodiments, a scheduler 216 can generate such a schedule based on the ability to switch contexts of offload processor(s) 208. In this way, on-module computing priorities can be adjusted on the fly. In very particular embodiments, a scheduler 216 can assign a portion of physical address space (e.g., memory locations within local memory 210) to an offload processor 208, according to computing tasks. The offload processor 208 can then switch between such different spaces, saving context information prior to each switch, and subsequently restoring context information when returning to the memory space.

Switch controller 218 can control computing operations of offload processor(s) 208. In particular embodiments, according to scheduler 216, switch controller 218 can order offload processor(s) 208 to switch contexts. It is understood that a context switch operation can be an "atomic" operation, executed in response to a single command from switch controller 218. In addition or alternatively, a switch controller 218 can issue an instruction set that stores current context information, recalls context information, etc.

In some embodiments, processor module 200 can include a buffer memory (not shown). A buffer memory can store received write data on board the processor module. A buffer memory can be implemented on an entirely different set of memory devices, or can be a memory embedded with logic and/or the offload processor. In the latter case, arbiter logic 206 can arbitrate access to the buffer memory. In some embodiments, a buffer memory can correspond to a portion of a system physical memory space. The remaining portion of the system memory space can correspond to other like processor modules and/or memory modules connected to the same system memory bus. In some embodiments buffer memory can be different than local memory 210. For example, buffer memory can have a slower access time than local memory 210. However, in other embodiments, buffer memory and local memory can be implemented with like memory devices.

In very particular embodiments, write data for processing can have an expected maximum flow rate. A processor module 200 can be configured to operate on such data at, or faster than, such a flow rate. In this way, a master device (not shown) can write data to a processor module without danger of over-writing data "in process".

The various computing elements of a processor module 200 can be implemented as one or more integrated circuit devices (ICs). It is understood that the various components shown in FIG. 2-0 can be formed in the same or different ICs. For example, control logic 212, memory interface 214, and/or arbiter logic 206 can be implemented on one or more logic ICs, while offload processor(s) 208 and local memory 210 are separate ICs. Logic ICs can be fixed logic (e.g., application specific ICs), programmable logic (e.g., field programmable gate arrays, FPGAs), or combinations thereof.

Advantageously, the foregoing hardware and systems can provide improved computational performance as compared to traditional computing systems. Conventional systems, including those based on x86 processors, are often ill-equipped to handle such high volume applications. Even idling, x86 processors use a significant amount of power, and near continuous operation for high bandwidth packet analysis or other high volume processing tasks make the processor energy costs one of the dominant price factors.

In addition, conventional systems can have issues with the high cost of context switching wherein a host processor is required to execute instructions which can include switching from one thread to another. Such a switch can require storing and recalling the context for the thread. If such context data is resident in a host cache memory, such a context switch can occur relatively quickly. However, if such context data is no longer in cache memory (i.e., a cache miss), the data must be recalled from system memory, which can incur a multi-cycle latency. Continuous cache misses during context switching can adversely impact system performance.

FIG. 2-1 shows a processor module 200-1 according to one very particular embodiment which is capable of reducing issues associated with high volume processing or context switching associated with many conventional server systems. A processor module 200-1 can include ICs 220-0/1 mounted to a printed circuit board (PCB) type substrate 222. PCB type substrate 222 can include in-line module connector 202, which in one very particular embodiment, can be a DIMM compatible connector. IC 220-0 can be a system-on-chip (SoC) type device, integrating multiple functions. In the very particular embodiment shown, an IC 220-0 can include embedded processor(s), logic and memory. Such embedded processor(s) can be offload processor(s) 208 as described herein, or equivalents. Such logic can be any of controller logic 212, memory interface 204 and/or arbiter logic 206, as described herein, or equivalents. Such memory can be any of local memory 210, cache memory for offload processor(s) 208, or buffer memory, as described herein, or equivalents. Logic IC 220-1 can provide logic functions not included IC 220-0.

FIG. 2-2 shows a processor module 200-2 according to another very particular embodiment. A processor module 200-2 can include ICs 220-2, -3, -4, -5 mounted to a PCB type substrate 222, like that of FIG. 2-1. However, unlike FIG. 2-1, processor module functions are distributed among single purpose type ICs. IC 220-2 can be a processor IC, which can be an offload processor 208. IC 220-3 can be a memory IC which can include local memory 210, buffer memory, or combinations thereof. IC 220-4 can be a logic IC which can include control logic 212, and in one very particular embodiment, can be an FPGA. IC 220-5 can be another logic IC which can include memory interface 204 and arbiter logic 206, and in one very particular embodiment, can also be an FPGA.

It is understood that FIGS. 2-1 and 2-2 represent but two of various implementations. The various functions of a processor module can be distributed over any suitable number of ICs, including a single SoC type IC.

Figures 2, 3:
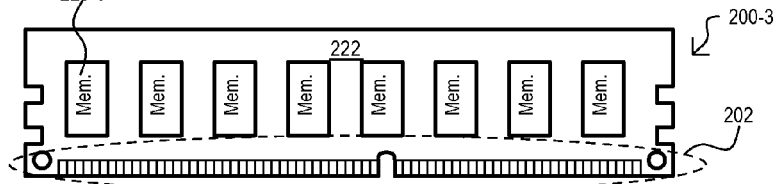

FIG. 2-3 shows an opposing side of a processor module 200-1 or 200-2 according to a very particular embodiment. Processor module 200-3 can include a number of memory ICs, one shown as 220-6, mounted to a PCB type substrate 222, like that of FIG. 2-1. It is understood that various processing and logic components can be mounted on an opposing side to that shown. A memory IC 220-6 can be configured to represent a portion of the physical memory space of a system. Memory ICs 220-6 can perform any or all of the following functions: operate independently of other processor module components, providing system memory accessed in a conventional fashion; serve as buffer memory, storing write data that can be processed with other processor module components, or serve as local memory for storing processor context information.

Figures 2, 3, 4:
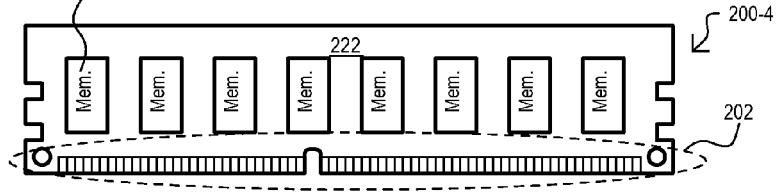

FIG. 2-4 shows a conventional DIMM module (i.e., it serves only a memory function) that can populate a memory bus along with processor modules as described herein, or equivalents.

FIG. 2-5 shows a system 230 according to one embodiment. A system 230 can include a system memory bus 228 accessible via multiple in-line module slots (one shown as 226). According to embodiments, any or all of the slots 226 can be occupied by a processor module 200 as described herein, or an equivalent. In the event all slots 226 are not occupied by a processor module 200, available slots can be occupied by conventional in-line memory modules 224. In a very particular embodiment, slots 226 can be DIMM slots.

In some embodiments, a processor module 200 can occupy one slot. However, in other embodiments, a processor module can occupy multiple slots.

In some embodiments, a system memory bus 228 can be further interfaced with one or more host processors and/or input/output device (not shown).

Having described processor modules according to various embodiments, operations of a processor module according to particular embodiments will now be described.

FIGS. 2-6 to 2-11 show processor module operations according to various embodiments. FIGS. 2-6 to 2-11 show a processor module like that of FIG. 2-0, along with a system memory bus 228, and a buffer memory 232. It is understood that in some embodiments, a buffer memory 232 can part of processor module 200. In such a case, arbitration between accesses via system memory bus 228 and offload processors can be controlled by arbiter logic 206.

Referring to FIG. 2-6, write data 234-0 can be received on system memory bus 228 (circle "1"). In some embodiments, such an action can include the writing of data to a particular physical address space range of a system memory. In a very particular embodiment, such an action can be a DMA write independent of any host processor. Write data 234-0 can include metadata (MD) as well as data to be processed (Data). In the embodiment shown, write data 234-0 can correspond to a particular processing operation (Session0).

Control logic 212 can access metadata (MD) of the write data 234-0 to determine a type of processing to be performed (circle "2") and/or classification of such data. In some embodiments, such an action can include a direct read from a physical address (i.e., MD location is at a predetermined location). In addition or alternatively, such an action can be an indirect read (i.e., MD is accessed via pointer, or the like). The action shown by circle "2" can be performed by any of: a read by control logic 212 or read by an offload processor 208.

From extracted metadata, scheduler 216 can create a processing schedule, or modify an existing schedule to accommodate the new computing task (circle "3").

Referring to FIG. 2-7, in response to a scheduler 216, the switch controller 218 can direct one or more offload processors 208 be begin processing data according to MD of the write data (circles "4", "5"). Such processing of data can include any of the following and equivalents: offload processor 208 can process write data stored in a buffer memory of the processor module 200, with accesses being arbitrated by arbiter logic 206, offload processor 208 can operate on data previously received, offload processor 208 can receive and operate on data stored at a location different than the processor module 200.

Referring to FIG. 2-8, additional write data 234-1 can be received on system memory bus 228 (circle "6"). Write data 234-1 can include metadata that indicates a different processing operation (Session1) than that for write data 234-0. Control logic 212 can access metadata (MD) of the new write data 234-1 to determine a type of processing to be performed (circle "7"). From extracted metadata, the scheduler 216 can modify the current schedule to accommodate the new computing task (circle "8"). In the particular example shown, the modified schedule re-tasks offload processor 208. Thus, switch controller 218 can direct the offload processor 208 to store its current context (ContextA) in local memory 210 (circle "9").

Referring to FIG. 2-9, in response to switch controller 218, offload processor(s) 208 can begin the new processing task (circle "10"). Consequently, offload processor(s) 208 can maintain a new context (ContextB) corresponding to the new processing task.

Referring to FIG. 2-10, a processing task by offload processor 208 can be completed. In the very particular embodiment shown, such processing can modify write data 234-1, and such data can be read out over system memory bus 228 (circle "11"). In response to the completion of processing task, scheduler 216 can update a schedule. In the example shown, in response to the updated schedule, switch controller 218 can direct offload processor(s) 208 to restore the previously saved context (ContextA) from local memory 210 (circle "12"). As understood from above, a restored context (e.g., ContextA) may have been stored by an offload processor different from the one that saved the context in the first place.

Referring to FIG. 2-11, with a previous context restored, offload processor(s) 208 can return to processing data according to the previous task (Session0) (circle "13").

FIG. 2-12 shows a method 240 according an embodiment. A method 240 can include detecting the write of session data to a system memory with a module interface 242. Such an action can include determining if received write data has metadata (i.e., data identifying a particular processing). It is understood that "session data" is data corresponding to a particular processing task. Further, it is understood that MD accompanying (or embedded within) session data can identify sessions having priorities with respect to one another. In particular embodiments, a module interface can be a slave interface for an in-line module.

A method 240 can determine if current offload processing is sufficient for a new session or change of session 244. Such an action takes into account a processing time required for any current sessions.

If current processing resources can accommodate new session requirements (Y from 244), a hardware schedule (schedule for controlling offload processor(s)) can be revised and the new session can be assigned to an offload processor. If current processing resources cannot accommodate new session requirements (N from 244), one or more offload processors can be selected for re-tasking (e.g., a context switch) 250 and the hardware schedule can be modified accordingly 252. The selected offload processors can save their current context data 254 and then switch to the new session 256. In some embodiments, revision of a hardware schedule (252) can include storing a context switch (e.g., in the case a new session has a lower priority than current sessions). In such a case, actions 254 and 256 would not occur until a later point in time.

FIG. 2-13 shows a method 260 according another embodiment. A method 260 can include determining if a computing session for an offload processor is complete 262 or has been terminated 264. In such cases (Y from 262/264), it can be determined if the freed module offload processor (i.e., an offload processor whose session is complete/terminated) has a stored context 266. That is, it can be determined if freed processor was previously operating on a session.

If a free offload processor was operating according to another session (Y from 266), the offload processor can restore the previous context 268. If a free offload processor has no stored context, it can be assigned to an existing session (if possible) 270. An existing hardware schedule can be updated correspondingly 272.

Processor modules according to embodiments herein can be employed to accomplish various processing tasks. According to some embodiments, processor modules can be attached to a system memory bus to operate on network packet data. Such embodiments will now be described.

FIG. 1-0 shows a system 101 that can transport packet data to one or more computational units (one shown as 100) located on a module, which in particular embodiments, can include a connector compatible with an existing memory module. In some embodiments, a computational unit 100 can include a processor module as described in embodiments herein, or an equivalent. A computational unit 100 can be capable of intercepting or otherwise accessing packets sent over a memory bus 116 and carrying out processing on such packets, including but not limited to termination or metadata processing. A system memory bus 116 can be a system memory bus like those described herein, or equivalents (e.g., 228).

According to some embodiments, packets corresponding to a particular flow can be transported to a storage location accessible by, or included within computational unit 100. Such transportation can occur without consuming resources of a host processor module 106c, connected to memory bus 116. In particular embodiments, such transport can occur without interrupting the host processor module 106c. In such an arrangement, a host processor module 106c does not have to handle incoming flows. Incoming flows can be directed to computational unit 100, which in particular embodiments can include a general purpose processor 108i. Such general purpose processors 108i can be capable of running code for terminating incoming flows.

In one very particular embodiment, a general purpose processor 108i can run code for terminating particular network flow session types, such as Apache video sessions, as but one example.

In addition or alternatively, a general purpose processor 108i can process metadata of a packet. In such embodiments, such metadata can include one or more fields of a header for the packet, or a header encapsulated further within the packet.

Referring still to FIG. 1-0, according to embodiments, a system 101 can carry out any of the following functions: 1) transport packets of a flow to a destination occupied by, or accessible by, a computational unit 100 without interrupting a host processor module 106c; 2) transport packets to an offload processor 108i capable of terminating session flows (i.e., the offload processor is responsible for terminating session flows); 3) transport packets to midplane switch that can process the metadata associated with a packet and make a switching decision; 4) provide a novel high speed packet terminating system.

Conventional packet processing systems can utilize host processors for packet termination. However, due to the context switching involved in handling multiple sessions, conventional approaches require significant processing overhead for such context switching, and can incur memory access and network stack delay.

In contrast to conventional approaches, embodiments as disclosed herein can enable high speed packet termination by reducing context switch overhead of a host processor. Embodiments can provide any of the following functions: 1) offload computation tasks to one or more processors via a system memory bus, without the knowledge of the host processor, or significant host processor involvement; 2) interconnect servers in a rack or amongst racks by employing offload processors as switches; or 3) use I/O virtualization to redirect incoming packets to different offload processors.

Referring still to FIG. 1-0, a system 101 can include an I/O device 102 which can receive packet or other I/O data from an external source. In some embodiments I/O device 102 can include physical or virtual functions generated by the physical device to receive a packet or other I/O data from the network or another computer or virtual machine. In the very particular embodiment shown, an I/O device 102 can include a network interface card (NIC) having input buffer 102a (e.g., DMA ring buffer) and an I/O virtualization function 102b.

According to embodiments, an I/O device 102 can write a descriptor including details of the necessary memory operation for the packet (i.e. read/write, source/destination). Such a descriptor can be assigned a virtual memory location (e.g., by an operating system of the system 101). I/O device 102 then communicates with an input output memory management unit (IOMMU) 104 which can translate virtual addresses to corresponding physical addresses with an IOMMU function 104b. In the particular embodiment shown, a translation look-aside buffer (TLB) 104a can be used for such translation. Virtual function reads or writes data between I/O device and system memory locations can then be executed with a direct memory transfer (e.g., DMA) via a memory controller 106b of the system 101. An I/O device 102 can be connected to IOMMU 104 by a host bus 112. In one very particular embodiment, a host bus 112 can be a peripheral interconnect (PCI) type bus. IOMMU 104 can be connected to a host processing section 106 at a central processing unit I/O (CPUIO) 106a. In the embodiment shown, such a connection 114 can support a HyperTransport (HT) protocol.

In the embodiment shown, a host processing section 106 can include the CPUIO 106a, memory controller 106b, processing core 106c and corresponding provisioning agent 106d.

In particular embodiments, a computational unit 100 can interface with the system bus 116 via standard in-line module connection, which in very particular embodiments can include a DIMM type slot. In the embodiment shown, a memory bus 116 can be a DDR3 type memory bus. Alternate embodiments can include any suitable system memory bus. Packet data can be sent by memory controller 106b via memory bus 116 to a DMA slave interface 110a. DMA slave interface 110a can be adapted to receive encapsulated read/write instructions from a DMA write over the memory bus 116.

A hardware scheduler (108b/c/d/e/h) can perform traffic management on incoming packets by categorizing them according to flow using session metadata. Packets can be queued for output in an onboard memory (110b/108a/108m) based on session priority. When the hardware scheduler determines that a packet for a particular session is ready to be processed by the offload processor 108i, the onboard memory is signaled for a context switch to that session. Utilizing this method of prioritization, context switching overhead can be reduced, as compared to conventional approaches. That is, a hardware scheduler can handle context switching decisions and thus optimize the performance of the downstream resource (e.g., offload processor 108i).

As noted above, in very particular embodiments, an offload processor 108i can be a "wimpy" core" type processor. According to some embodiments, a host processor 106c can be a "brawny core" type processor (e.g., an x86 or any other processor capable of handling "heavy touch" computational operations). While an I/O device 102 can be configured to trigger host processor interrupts in response to incoming packets, according to embodiments, such interrupts can be disabled, thereby reducing processing overhead for the host processor 106c. In some very particular embodiments, an offload processor 108i can include an ARM, ARC, Tensilica, MIPS, Strong/ARM or any other processor capable of handling "light touch" operations. Preferably, an offload processor can run a general purpose operating system for executing a plurality of sessions, which can be optimized to work in conjunction with the hardware scheduler in order to reduce context switching overhead.

Referring still to FIG. 1-0, in operation, a system 101 can receive packets from an external network over a network interface. The packets are destined for either a host processor 106c or an offload processor 108i based on the classification logic and schematics employed by I/O device 102. In particular embodiments, I/O device 102 can operate as a virtualized NIC, with packets for a particular logical network or to a certain virtual MAC (VMAC) address can be directed into separate queues and sent over to the destination logical entity. Such an arrangement can transfer packets to different entities. In some embodiments, each such entity can have a virtual driver, a virtual device model that it uses to communicate with virtual network interfaces it is connected to.

According to embodiments, multiple devices can be used to redirect traffic to specific memory addresses. So, each of the network devices operates as if it is transferring the packets to the memory location of a logical entity. However, in reality, such packets are transferred to memory addresses where they can be handled by one or more offload processors (e.g., 108i). In particular embodiments such transfers are to physical memory addresses, thus logical entities can be removed from the processing, and a host processor can be free from such packet handling.

Accordingly, embodiments can be conceptualized as providing a memory "black box" to which specific network data can be fed. Such a memory black box can handle the data (e.g., process it) and respond back when such data is requested.

Referring still to FIG. 1-0, according to some embodiments, I/O device 102 can receive data packets from a network or from a computing device. The data packets can have certain characteristics, including transport protocol number, source and destination port numbers, source and destination IP addresses, for example. The data packets can further have metadata that is processed (108d) that helps in their classification and management.

I/O device 102 can include, but is not limited to, peripheral component interconnect (PCI) and/or PCI express (PCIe) devices connecting with a host motherboard via PCI or PCIe bus 9 (e.g., 112). Examples of I/O devices include a network interface controller (NIC), a host bus adapter, a converged network adapter, an ATM network interface, etc.

In order to provide for an abstraction scheme that allows multiple logical entities to access the same I/O device 102, the I/O device may be virtualized to provide for multiple virtual devices each of which can perform some of the functions of the physical I/O device. The IO virtualization program (e.g., 102b) according to an embodiment, can redirect traffic to different memory locations (and thus to different offload processors attached to modules on a memory bus). To achieve this, an I/O device 102 (e.g., a network card) may be partitioned into several function parts; including controlling function (CF) supporting input/output virtualization (IOV) architecture (e.g., single-root IOV) and multiple virtual function (VF) interfaces. Each virtual function interface may be provided with resources during runtime for dedicated usage. Examples of the CF and VF may include the physical function and virtual functions under schemes such as Single Root I/O Virtualization or Multi-Root I/O Virtualization architecture. The CF acts as the physical resources that sets up and manages virtual resources. The CF is also capable of acting as a full-fledged IO device. The VF is responsible for providing an abstraction of a virtual device for communication with multiple logical entities/multiple memory regions.

The operating system/the hypervisor/any of the virtual machines/user code running on a host processor 106c may be loaded with a device model, a VF driver and a driver for a CF. The device model may be used to create an emulation of a physical device for the host processor 106c to recognize each of the multiple VFs that are created. The device model may be replicated multiple times to give the impression to a VF driver (a driver that interacts with a virtual IO device) that it is interacting with a physical device of a particular type.

For example, a certain device module may be used to emulate a network adapter such as the Intel® Ethernet Converged Network Adapter (CNA) X540-T2, so that the I/O device 102 believes it is interacting with such an adapter. In such a case, each of the virtual functions may have the capability to support the functions of the above said CNA, i.e., each of the Physical Functions should be able to support such functionality. The device model and the VF driver can be run in either privileged or non-privileged mode. In some embodiments, there is no restriction with regard to who hosts/runs the code corresponding to the device model and the VF driver. The code, however, has the capability to create multiple copies of device model and VF driver so as to enable multiple copies of said I/O interface to be created.

An application or provisioning agent 106d, as part of an application/user level code running in a kernel, may create a virtual I/O address space for each VF, during runtime and allocate part of the physical address space to it. For example, if an application handling the VF driver instructs it to read or write packets from or to memory addresses 0xaaaa to 0xffff, the device driver may write I/O descriptors into a descriptor queue with a head and tail pointer that are changed dynamically as queue entries are filled. The data structure may be of another type as well, including but not limited to a ring structure 102a or hash table.

The VF can read from or write data to the address location pointed to by the driver. Further, on completing the transfer of data to the address space allocated to the driver, interrupts, which are usually triggered to the host processor to handle said network packets, can be disabled. Allocating a specific I/O space to a device can include allocating said IO space a specific physical memory space occupied.

In another embodiment, the descriptor may comprise only a write operation, if the descriptor is associated with a specific data structure for handling incoming packets. Further, the descriptor for each of the entries in the incoming data structure may be constant so as to redirect all data write to a specific memory location. In an alternate embodiment, the descriptor for consecutive entries may point to consecutive entries in memory so as to direct incoming packets to consecutive memory locations.

Alternatively, said operating system may create a defined physical address space for an application supporting the VF drivers and allocate a virtual memory address space to the application or provisioning agent 106d, thereby creating a mapping for each virtual function between said virtual address and a physical address space. Said mapping between virtual memory address space and physical memory space may be stored in IOMMU tables (e.g., a TLB 104a). The application performing memory reads or writes may supply virtual addresses to say virtual function, and the host processor OS may allocate a specific part of the physical memory location to such an application.

Alternatively, VF may be configured to generate requests such as read and write which may be part of a direct memory access (DMA) read or write operation, for example. The virtual addresses is be translated by the IOMMU 104 to their corresponding physical addresses and the physical addresses may be provided to the memory controller for access. That is, the IOMMU 104 may modify the memory requests sourced by the I/O devices to change the virtual address in the request to a physical address, and the memory request may be forwarded to the memory controller for memory access. The memory request may be forwarded over a bus 114 that supports a protocol such as HyperTransport 114. The VF may in such cases carry out a direct memory access by supplying the virtual memory address to the IOMMU 104.

Alternatively, said application may directly code the physical address into the VF descriptors if the VF allows for it. If the VF cannot support physical addresses of the form used by the host processor 106c, an aperture with a hardware size supported by the VF device may be coded into the descriptor so that the VF is informed of the target hardware address of the device. Data that is transferred to an aperture may be mapped by a translation table to a defined physical address space in the system memory. The DMA operations may be initiated by software executed by the processors, programming the I/O devices directly or indirectly to perform the DMA operations.

Referring still to FIG. 1-0, in particular embodiments, parts of computational unit 100 can be implemented with one or more FPGAs. In the system of FIG. 1-0, computational unit 100 can include FPGA 110 in which can be formed a DMA slave device module 110a and arbiter 110f. A DMA slave module 110a can be any device suitable for attachment to a memory bus 116 that can respond to DMA read/write requests. In alternate embodiments, a DMA slave module 110a can be another interface capable of block data transfers over memory bus 116. The DMA slave module 110a can be capable of receiving data from a DMA controller (when it performs a read from a 'memory' or from a peripheral) or transferring data to a DMA controller (when it performs a write instruction on the DMA slave module 110a). The DMA slave module 110a may be adapted to receive DMA read and write instructions encapsulated over a memory bus, (e.g., in the form of a DDR data transmission, such as a packet or data burst), or any other format that can be sent over the corresponding memory bus.

A DMA slave module 110a can reconstruct the DMA read/write instruction from the memory R/W packet. The DMA slave module 110a may be adapted to respond to these instructions in the form of data reads/data writes to the DMA master, which could either be housed in a peripheral device, in the case of a PCIe bus, or a system DMA controller in the case of an ISA bus.

I/O data that is received by the DMA device 110a can then queued for arbitration. Arbitration can include the process of scheduling packets of different flows, such that they are provided access to available bandwidth based on a number of parameters. In general, an arbiter 110f provides resource access to one or more requestors. If multiple requestors request access, an arbiter 110f can determine which requestor becomes the accessor and then passes data from the accessor to the resource interface, and the downstream resource can begin execution on the data. After the data has been completely transferred to a resource, and the resource has competed execution, the arbiter 110f can transfer control to a different requestor and this cycle repeats for all available requestors. In the embodiment of FIG. 1-10, arbiter 110f can notify other portions of computational unit 100 (e.g., 108) of incoming data.

Alternatively, a computation unit 100 can utilize an arbitration scheme shown in U.S. Pat. No. 7,813,283, issued to Dalal on Oct. 12, 2010, the contents of which are incorporated herein by reference. Other suitable arbitration schemes known in art could be implemented in embodiments herein. Alternatively, the arbitration scheme of the current invention might be implemented using an OpenFlow switch and an OpenFlow controller.

In the very particular embodiment of FIG. 1-0, computational unit 100 can further include notify/prefetch circuits 110c which can prefetch data stored in a buffer memory 110b in response to DMA slave module 110a, and as arbitrated by arbiter 110f. Further, arbiter 110f can access other portions of the computational unit 100 via a memory mapped I/O ingress path 110e and egress path 110g.

Referring to FIG. 1-0, a hardware scheduler can include a scheduling circuit 108b/n to implement traffic management of incoming packets. Packets from a certain source, relating to a certain traffic class, pertaining to a specific application or flowing to a certain socket are referred to as part of a session flow and are classified using session metadata. Such classification can be performed by classifier 108e.

In some embodiments, session metadata 108d can serve as the criterion by which packets are prioritized and scheduled and as such, incoming packets can be reordered based on their session metadata. This reordering of packets can occur in one or more buffers and can modify the traffic shape of these flows. The scheduling discipline chosen for this prioritization, or traffic management (TM), can affect the traffic shape of flows and micro-flows through delay (buffering), bursting of traffic (buffering and bursting), smoothing of traffic (buffering and rate-limiting flows), dropping traffic (choosing data to discard so as to avoid exhausting the buffer), delay jitter (temporally shifting cells of a flow by different amounts) and by not admitting a connection (e.g., cannot simultaneously guarantee existing service (SLAs) with an additional flow's SLA).

According to embodiments, computational unit 100 can serve as part of a switch fabric, and provide traffic management with depth-limited output queues, the access to which is arbitrated by a scheduling circuit 108b/n. Such output queues are managed using a scheduling discipline to provide traffic management for incoming flows. The session flows queued in each of these queues can be sent out through an output port to a downstream network element.

It is noted that a conventional traffic management circuit doesn't take into account the handling and management of data by downstream elements except for meeting the SLA agreements it already has with said downstream elements.

In contrast, according to embodiments a scheduler circuit 108b/n can allocate a priority to each of the output queues and carry out reordering of incoming packets to maintain persistence of session flows in these queues. A scheduler circuit 108b/n can be used to control the scheduling of each of these persistent sessions into a general purpose operating system (OS) 108j, executed on an offload processor 108i. Packets of a particular session flow, as defined above, can belong to a particular queue. The scheduler circuit 108b/n may control the prioritization of these queues such that they are arbitrated for handling by a general purpose (GP) processing resource (e.g., offload processor 108i) located downstream. An OS 108j running on a downstream processor 108i can allocate execution resources such as processor cycles and memory to a particular queue it is currently handling. The OS 108j may further allocate a thread or a group of threads for that particular queue, so that it is handled distinctly by the general purpose processing element 108i as a separate entity. The fact that there can be multiple sessions running on a GP processing resource, each handling data from a particular session flow resident in a queue established by the scheduler circuit, tightly integrates the scheduler and the downstream resource (e.g., 108i). This can bring about persistence of session information across the traffic management and scheduling circuit and the general purpose processing resource 108j.

Dedicated computing resources (e.g., 108i), memory space and session context information for each of the sessions can provide a way of handling, processing and/or terminating each of the session flows at the general purpose processor 108i. The scheduler circuit 108b/n can exploit this functionality of the execution resource to queue session flows for scheduling downstream. The scheduler circuit 108b/n can be informed of the state of the execution resource(s) (e.g., 108i), the current session that is run on the execution resource; the memory space allocated to it, the location of the session context in the processor cache.

According to embodiments, a scheduler circuit 108b/n can further include switching circuits to change execution resources from one state to another. The scheduler circuit 108b/n can use such a capability to arbitrate between the queues that are ready to be switched into the downstream execution resource. Further, the downstream execution resource can be optimized to reduce the penalty and overhead associated with context switch between resources. This is further exploited by the scheduler circuit 108b/n to carry out seamless switching between queues, and consequently their execution as different sessions by the execution resource.

A scheduler circuit 108b/n according to embodiments can schedule different sessions on a downstream processing resource, wherein the two are operated in coordination to reduce the overhead during context switches. An important factor in decreasing the latency of services and engineering computational availability can be hardware context switching synchronized with network queuing. In embodiments, when a queue is selected by a traffic manager, a pipeline coordinates swapping in of the cache (e.g., L2 cache) of the corresponding resource (e.g., 108i) and transfers the reassembled I/O data into the memory space of the executing process. In certain cases, no packets are pending in the queue, but computation is still pending to service previous packets. Once this process makes a memory reference outside of the data swapped, the scheduler circuit (108b/n) can enable queued data from an I/O device 102 to continue scheduling the thread.

In some embodiments, to provide fair queuing to a process not having data, a maximum context size can be assumed as data processed. In this way, a queue can be provisioned as the greater of computational resource and network bandwidth resource. As but one very particular example, a computation resource can be an ARM A9 processor running at 800 MHz, while a network bandwidth can be 3 Gbps of bandwidth. Given the lopsided nature of this ratio, embodiments can utilize computation having many parallel sessions (such that the hardware's prefetching of session-specific data offloads a large portion of the host processor load) and having minimal general purpose processing of data.

Accordingly, in some embodiments, a scheduler circuit 108b/n can be conceptualized as arbitrating, not between outgoing queues at line rate speeds, but arbitrating between terminated sessions at very high speeds. The stickiness of sessions across a pipeline of stages, including a general purpose OS, can be a scheduler circuit optimizing any or all such stages of such a pipeline.

Alternatively, a scheduling scheme can be used as shown in U.S. Pat. No. 7,760,715 issued to Dalal on Jul. 20, 2010, incorporated herein by reference. This scheme can be useful when it is desirable to rate limit the flows for preventing the downstream congestion of another resource specific to the over-selected flow, or for enforcing service contracts for particular flows. Embodiments can include arbitration scheme that allows for service contracts of downstream resources, such as general purpose OS that can be enforced seamlessly.

Referring still to FIG. 1-0, a hardware scheduler according to embodiments herein, or equivalents, can provide for the classification of incoming packet data into session flows based on session metadata. It can further provide for traffic management of these flows before they are arbitrated and queued as distinct processing entities on the offload processors.

In some embodiments, offload processors (e.g., 108i) can be general purpose processing units capable of handling packets of different application or transport sessions. Such offload processors can be low power processors capable of executing general purpose instructions. The offload processors could be any suitable processor, including but not limited to: ARM, ARC, Tensilica, MIPS, StrongARM or any other processor that serves the functions described herein. Such offload processors have a general purpose OS running on them, wherein the general purpose OS is optimized to reduce the penalty associated with context switching between different threads or group of threads.

In contrast, context switches on host processors can be computationally intensive processes that require the register save area, process context in the cache and TLB entries to be restored if they are invalidated or overwritten. Instruction Cache misses in host processing systems can lead to pipeline stalls and data cache misses lead to operation stall and such cache misses reduce processor efficiency and increase processor overhead.

In contrast, an OS 108j running on the offload processors 108i in association with a scheduler circuit 108b/n, can operate together to reduce the context switch overhead incurred between different processing entities running on it. Embodiments can include a cooperative mechanism between a scheduler circuit and the OS on the offload processor 108i, wherein the OS sets up session context to be physically contiguous (physically colored allocator for session heap and stack) in the cache; then communicates the session color, size, and starting physical address to the scheduler circuit upon session initialization. During an actual context switch, a scheduler circuit can identify the session context in the cache by using these parameters and initiate a bulk transfer of these contents to an external low latency memory. In addition, the scheduler circuit can manage the prefetch of the old session if its context was saved to a local memory 108g. In particular embodiments, a local memory 108g can be low latency memory, such as a reduced latency dynamic random access memory (RLDRAM), as but one very particular embodiment. Thus, in embodiments, session context can be identified distinctly in the cache.

In some embodiments, context size can be limited to ensure fast switching speeds. In addition or alternatively, embodiments can include a bulk transfer mechanism to transfer out session context to a local memory 108g. The cache contents stored therein can then be retrieved and prefetched during context switch back to a previous session. Different context session data can be tagged and/or identified within the local memory 108g for fast retrieval. As noted above, context stored by one offload processor may be recalled by a different offload processor.

In the very particular embodiment of FIG. 1-0, multiple offload processing cores can be integrated into a computation FPGA 108. Multiple computational FPGAs can be arbitrated by arbitrator circuits in another FPGA 110. The combination of computational FPGAs (e.g., 108) and arbiter FPGAs (e.g., 110) are referred to as "XIMM" modules or "Xockets DIMM modules" (e.g., computation unit 100). In particular applications, these XIMM modules can provide integrated traffic and thread management circuits that broker execution of multiple sessions on the offload processors.

FIG. 1-0 also shows an offload processor tunnel connection 608k, as well as a memory interface 108m and port 1081 (which can be an accelerator coherency port (ACP)). Memory interface 108m can access buffer memory 108a.

FIG. 1-1 shows a system flow according to an embodiment. Packet or other I/O data can be received at an I/O device 120. An I/O device can be physical device, virtual device or combination thereof. Interrupts generated from the I/O data intended for a host processor 124 can be disabled, allowing such I/O data to be processed without resources of the host processor 124.

An IOMMU 121 can map received data to physical addresses of a system address space. DMA master 125 can transmit such data to such memory addresses by operation of a memory controller 122. Memory controller 122 can execute DRAM transfers over a memory bus with a DMA Slave. Upon receiving transferred I/O data, a hardware scheduler 123 can schedule processing of such data with an offload processor 126. In some embodiments, a type of processing can be indicated by metadata within the I/O data. Further, in some embodiments such data can be stored in an onboard memory 129. According to instructions from hardware scheduler 123, one or more offload processors 126 can executing computing functions in response to the I/O data. In some embodiments, such computing functions can operate on the I/O data, and such data can be subsequently read out on memory bus via a read request processed by DMA Slave 127.

Parallelization of tasks into multiple thread contexts is well known in art to provide for increased throughput. Processors architectures such as MIPS may include deep instructions pipelines to improve the number of instructions per cycle. Further, the ability to run a multi-threaded programming environment results in enhanced usage of existing processor resources. To further increase parallel execution on the hardware, processor architecture may include multiple processor cores. Multi-core architectures comprising of the same type of cores, referred to as homogeneous core architectures, provide higher instruction throughput by parallelizing threads or processes across multiple cores. However, in such homogeneous core architectures, the shared resources, such as memory, are amortized over a small number of processors.

Memory and I/O accesses can incur a high amount of processor overhead. Further, context switches in conventional general purpose processing units can be computationally intensive. It is therefore desirable to reducing context switch overhead in a networked computing resource handling a plurality of networked applications in order to increase processor throughput. Conventional server loads can require complex transport, high memory bandwidth, extreme amounts of data bandwidth (randomly accessed, parallelized, and highly available), but often with light touch processing: HTML, video, packet-level services, security, and analytics. Further, idle processors still consume more than 50% of their peak power consumption.

In contrast, according to embodiments herein, complex transport, data bandwidth intensive, frequent random access oriented, 'light' touch processing loads can be handled behind a socket abstraction created on the offload processor cores. At the same time, "heavy" touch, computing intensive loads can be handled by a socket abstraction on a host processor core (e.g., x86 processor cores). Such software sockets can allow for a natural partitioning of these loads between ARM and x86 processor cores. By usage of new application level sockets, according to embodiments, server loads can be broken up across the offload processing cores and the host processing cores.

FIG. 3 shows protocol stacks that can be included in a system according to embodiments. A host processor (e.g., 106c) can include a brawny core protocol stack 317. Such a protocol stack 317 can include one or more applications (Application) 318 sitting on an operating system (OS) 319. Unlike conventional host processing stacks, an OS can include a Xockets Socket 330 and Xockets Tunneling Driver 320 which can access XIMMs as described herein or equivalents. In particular embodiments, Socket 330 can facilitates communication between a host processor and an offload processor module (e.g., 100) and Driver 320 can enable transmission of packet data to an offload processor module (e.g., 100) (e.g., Ethernet-over-DDR tunneling). A brawny core protocol stack 317 can further include a Hypervisor 312 to supervise sessions and/or enable virtual switches 310 as described herein, or equivalents.

An offload processor can include wimpy core protocol stack 300. In the embodiment shown, such a protocol stack 300 can include a single session OS 302 which can run an application 303. Additional software functions 304 can control context switching, prefetching of data, and memory mapped scheduling. As packets belonging to different sessions ingress, the offload processors can rapidly switch contexts and read from different parts of memory in order to service them. Queuing and reassembly functions (320) can take decrypted incoming fragments of data, assemble them into their original form and queue them for processing on one of multiple offload processors onboard a module (e.g., 100). Input-output memory management software (e.g., IOMMU of 308) can be provided in order to facilitate safe sharing and usage of physical memory when the arbitration processor switches between virtual sessions for incoming packets. Direct memory access (e.g., R/DMA of 308) can allow for direct read/write to an internal memory of a module (e.g., 100). An offload processor can also utilize a virtual switching software (312) to provide switching as described herein. Header services (310) can process header data of received packets.

Example embodiments of offload processors can include, but are not limited to, ARM A9 Cortex processors, which have a clock speed of 800 MHz and a data handling capacity of 3 Ghz. The queue depth for the traffic management circuit can be configured to be the smaller of the processing power and the network bandwidth. Given the lopsided nature of this ratio, in order to handle complete network bandwidth, sessions can be of a lightweight processing nature. Further, sessions to can be switched with minimum context switch overhead to allow the offload processor to process the high bandwidth network traffic. Further, the offload processors can provide session handling capacity greater than conventional approaches due to the ability to terminate sessions with little or no overhead. The offload processors according to embodiments are favorably disposed to handle complete offload of Apache video routing, as but one very particular embodiment.

Alternatively in another embodiment, when equipped with many XIMMs, each containing multiple "wimpy" cores, systems may be placed near the top of rack, where they can be used as a cache for data and a processing resource for rack hot content or hot code, a means for interconnecting between racks and TOR switches, a mid tier between TOR switches and second-level switches, rack-level packet filtering, logging, and analytics, or various types of rack-level control plane agents. Simple passive optical mux/demux-ing can separate high bandwidth ports on the x86 systems into many lower bandwidth ports as needed.

Embodiments can be favorably disposed to handle Apache, HTML, and application cache and rack level mid plane functions. In other embodiments, a network of XIMMs and a host x86 processors may be used to provide routing overlays.

FIG. 4 is a flow schematic wherein network packets 450 are transferred to offload processors 430 mounted with memory device 410, which can be wimpy core devices, completely without intervention of the host CPU 420, which can be a brawny core device. The offload processors 430 can act as full-fledged processors hosting server applications. In one embodiment, packets 450 can be received via an I/O device 440 (e.g., NIC). A host processor 420 can be free to execute other operations 660 while offload processors 430 service network packets 450.

Figures 2, 3, 4, 5:
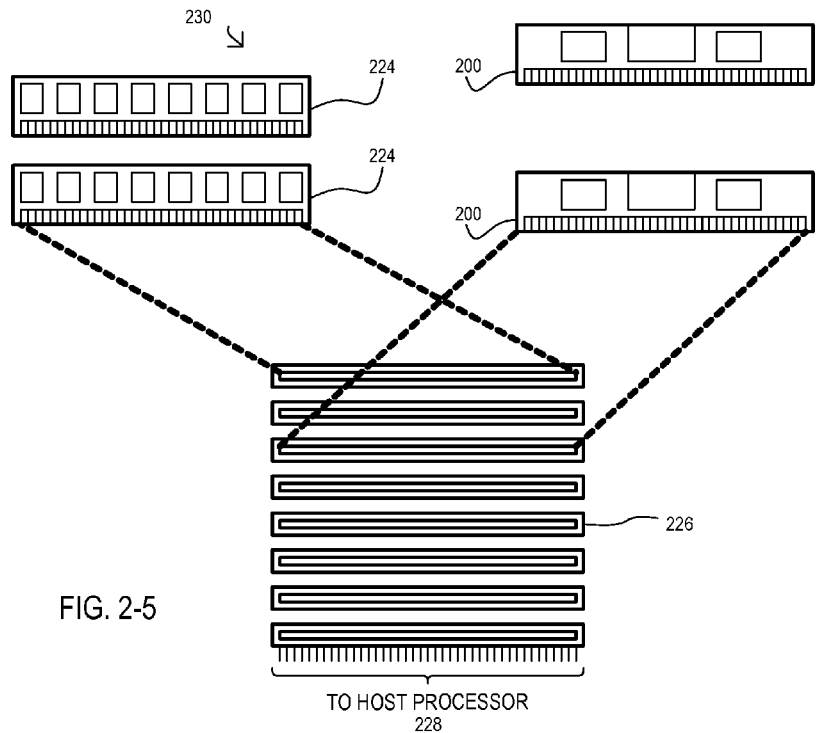

FIG. 5 is an alternate embodiment, in which server loads are partitioned such that packet meta data processing, routing overlays, filtering, packet logging and other hygiene functions are offloaded to the offload processors (530) mounted with memory devices 510, while and the host processor (520) implements server sessions. Offload processors 530 can be wimpy core devices, while host processor 520 can be a brawny core device. As in the case of FIG. 4, packets can flow through an I/O device 540 and offload processors 530 can be mounted with a memory device 510.

In another embodiment, a network of offload processor modules (i.e., XIMMs), each comprising a plurality of said offload processors may be employed to provide video overlays by associating said offload processors with local memory elements, including closely located DIMMs or solid state storage devices (SSDs). The network of XIMM modules may be used to perform memory read or writes for prefetching the data contents before they are serviced. In this case, real-time transport protocol (RTP) can be processed before packets enter traffic management, and their corresponding video data can be pre-fetched to match the streaming. Prefetches can be physically issued as (R)DMAs to other (remote) local DIMMs/SSDs. For enterprise applications, the number of the videos is limited and can be kept in local Xockets DIMMs. For public cloud/content delivery network (CDN) applications, this allows a rack to provide a shared memory space for the corpus of videos. The prefetching may be setup from any memory DIMM on any machine.

It is anticipated that prefetching can be balanced against peer-to-peer distribution protocols (e.g. P4P) so that blocks of data can be efficiently sourced from all relevant servers. The bandwidth metric indicates how many streams can be sustained when using 10 Mbps (1 Mbps) streams. As the stream bandwidth goes down the number of streams goes up and the same session limitation becomes manifest in the RTP processing of server. Architecture according to such embodiments can allow over 10,000 high definition streams to be sustained in a 1U (one rack unit) form factor.

Figures 2, 3, 4, 5, 6:
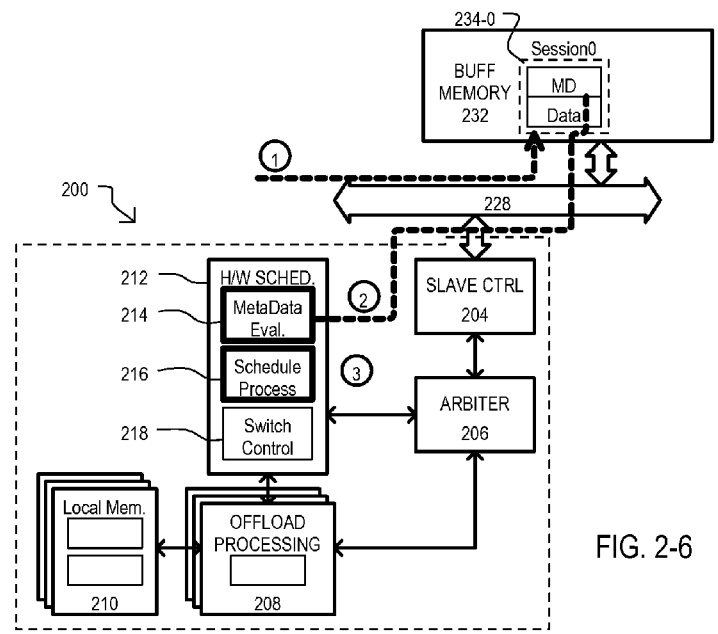
Figures 2, 3, 4, 5, 6, 7:
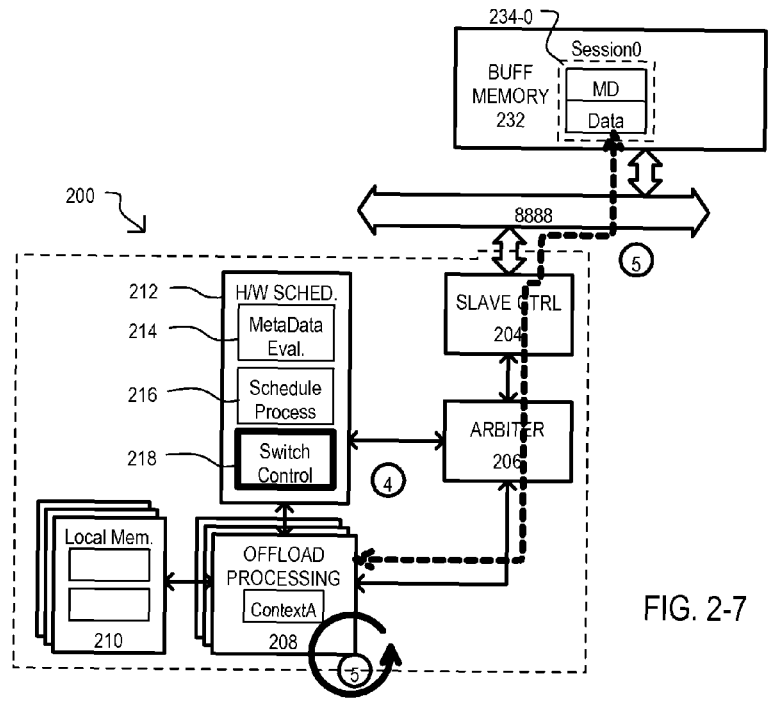
Figures 2, 3, 4, 5, 6, 7, 8:
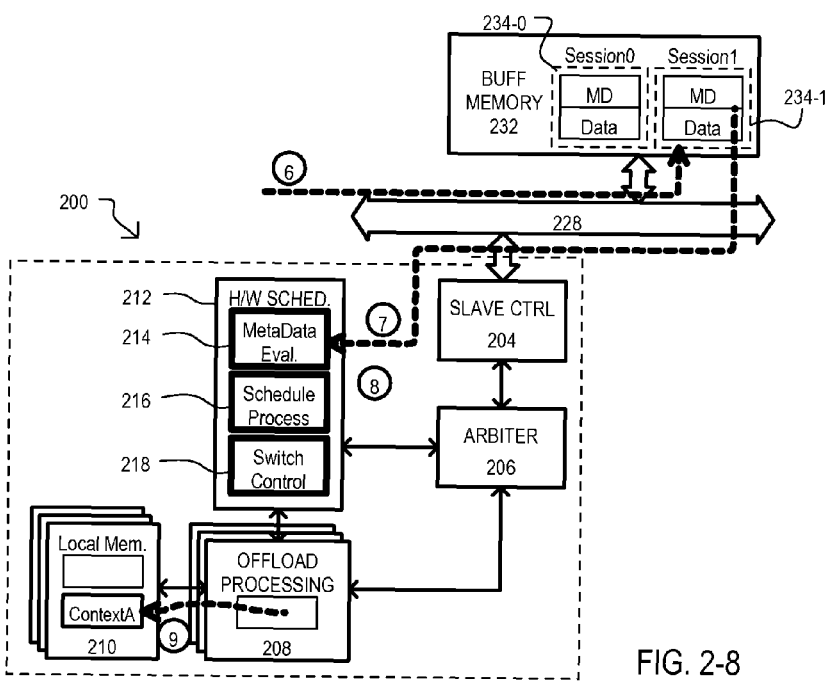
Figures 2, 3, 4, 5, 6, 7, 8, 9:
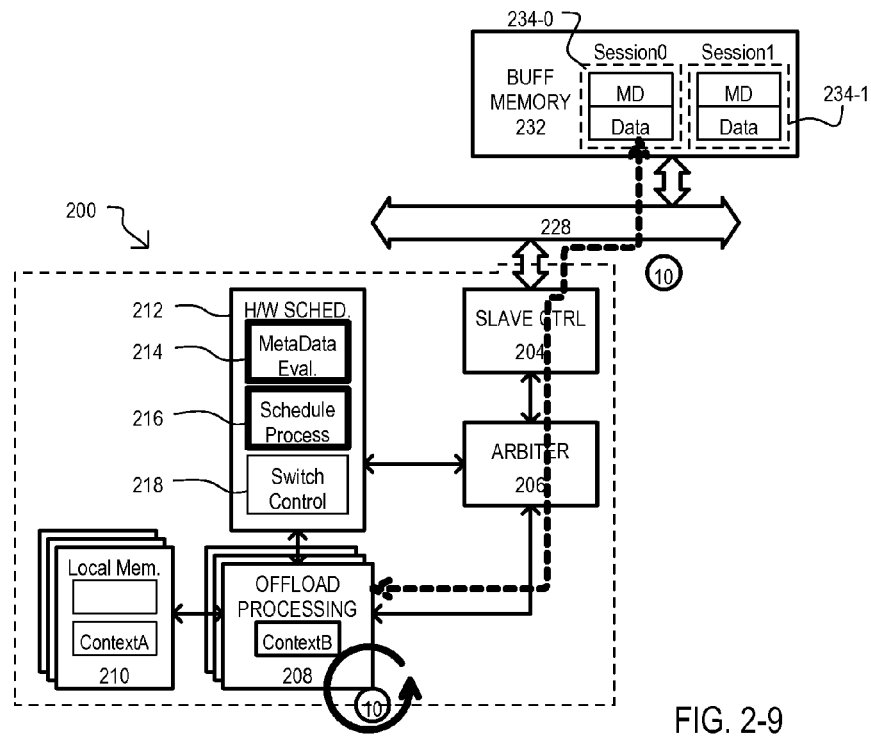
Figures 2, 3, 4, 5, 6, 7, 8, 9, 10:
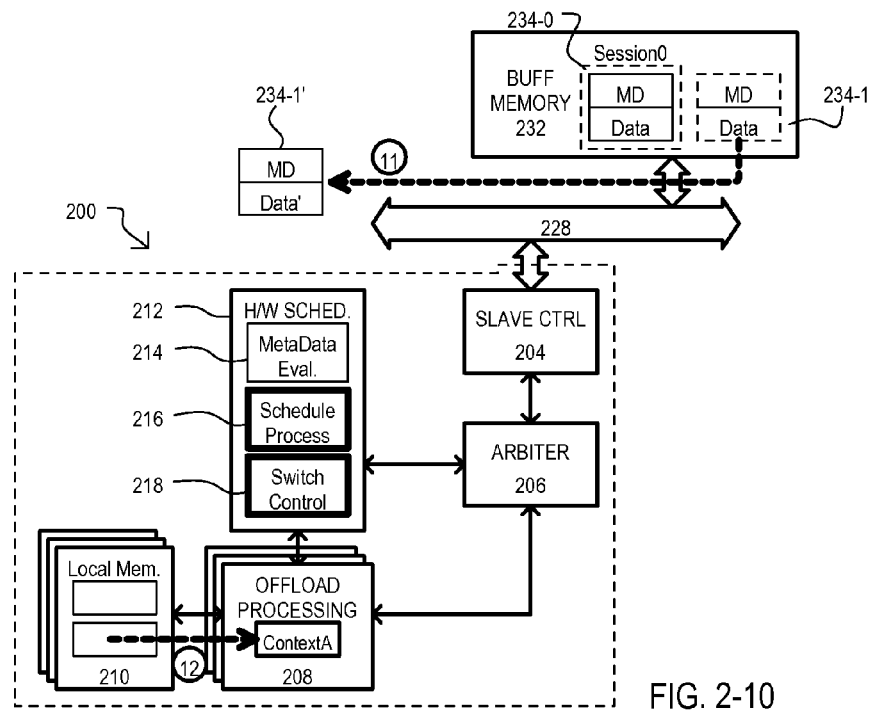
Figures 2, 3, 4, 5, 6, 7, 8, 9, 10, 11:
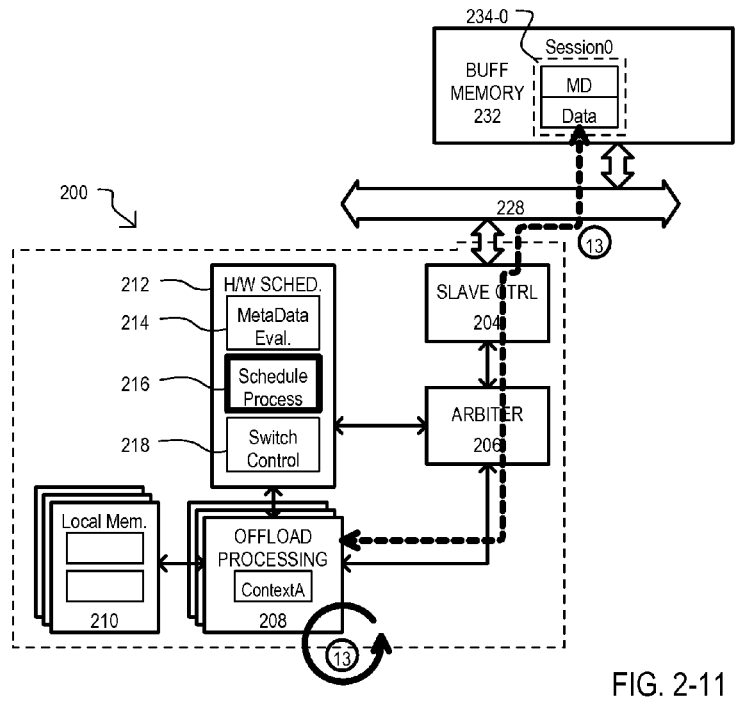
Figures 2, 3, 4, 5, 6, 7, 8, 9, 10, 11, 12:
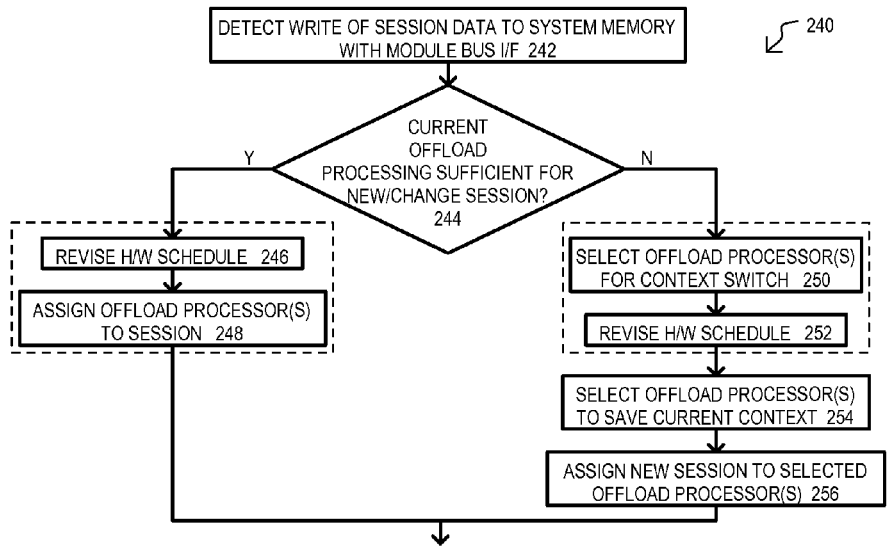
Figures 2, 3, 4, 5, 6, 7, 8, 9, 10, 11, 12, 13:
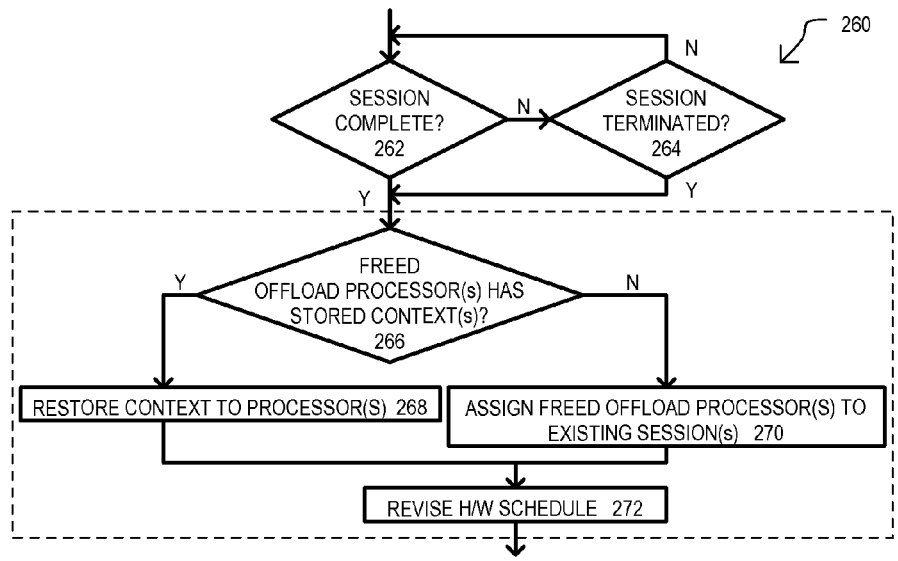
Figure 3:
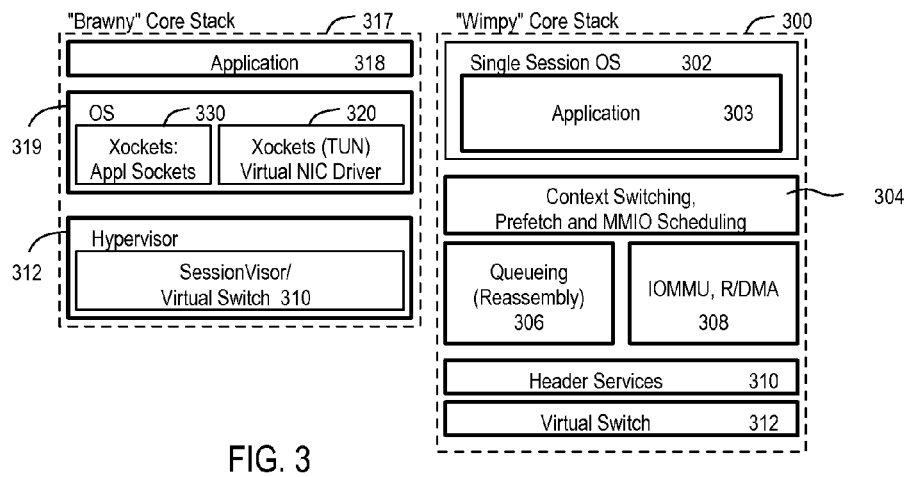
Figure 4:
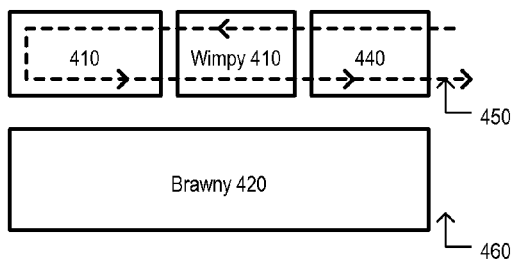
Figure 5:
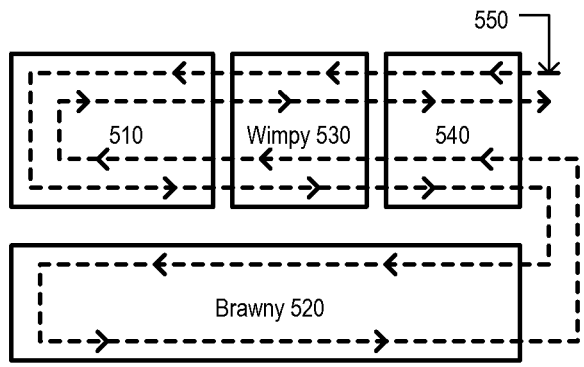
Figure 6:
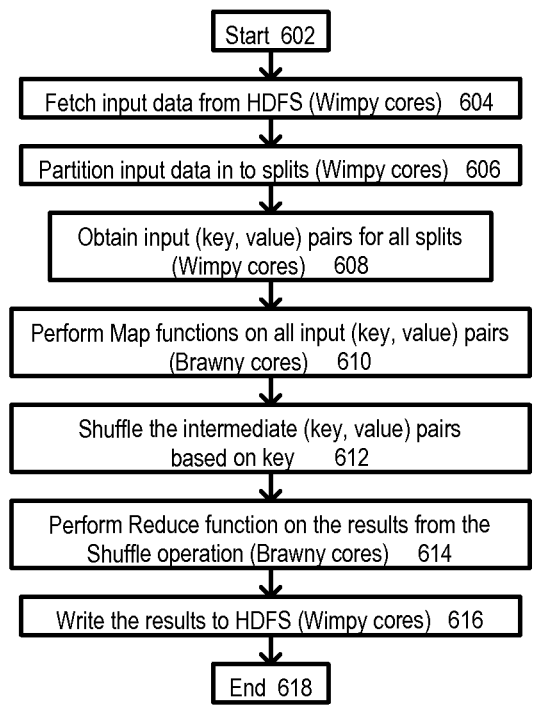

In an alternate embodiment shown in FIG. 6, a complex publish and subscribership model, for handling pipelined computational tasks partitioned across a network of x86 cores and offload processor cores, can be implemented. Each task in the pipeline may be handled by the type of cores that are most favorably disposed for it. For example, offload processor modules (e.g., Xockets DIMMs) may be employed to carry out acceleration of Map-Reduce algorithms by an order of magnitude. The midplane defined by Xockets DIMMs can drive and receive the large PCI-e 3.0 bandwidth connecting Map steps with Reduce steps within a rack and outside of the rack. Because the shuffle step is often the bottleneck, the number of reducers is kept to a minimum so that CPUs are not overwhelmed with having to filter keys. With traffic-managed according to embodiments, the number of Reducers can rival the number of Mappers.

FIG. 6 shows a method which can start 602 and fetch input data from a file system (e.g., Hadoop Distributed File System) 604. Such data can be fetched to wimpy core devices (e.g., offload processors as described herein or equivalents). Such input data can be partitioned into splits by the wimpy core devices 606. Input pairs (which can include a key and value) for such splits can be obtained 608. A map function can be performed on all input pairs with brawny core devices (e.g., host processor(s)) 610. All the mapping operation results can be reduced and sorted based on key values with brawny core devices 612. Results can be written back to the file system 614. Such an operation can be accomplished via wimpy core devices. A method may then end 616.

Alternatively, embodiments can employ the Xocket DIMMs to implement rack level disks using memory mapped file paradigm. Such embodiments can effectively unify all of the contents on the Xockets DIMMs on the rack to every x86 processor socket.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A system, comprising:
a host processor connected to system memory having a physical address space via a system memory bus; and
at least one offload processor module, including
at least one offload processor mounted on the offload processor module, and configured to execute operations on data received over the system memory bus as at least one write operation to a predetermined physical address of the system memory, and to output context data to a context memory, and read context data from the context memory, and
hardware scheduling logic mounted on the module and configured to control operations of the at least one offload processor based on metadata contained in the at least one write operation.

2. The system of claim 1, further comprising:
an in-line module connector is configured to physically connect the the offload processor module to at least one in-line memory slot of the system memory bus, with the in-line module connector being compatible with a dual-in-line-memory module (DIMM) connector.

3. The system of claim 1, wherein:
the memory bus comprises a double-data-rate (DDR) memory bus.

4. The system module of claim 1, wherein
the at least one processor module further includes a slave interface configured to receive write data and provide read data over the system memory bus in response to a bus controller.

5. The system of claim 1, further including:
at least one memory module that includes
an in-module connector configured to physically connect the memory module to one slot of the system memory bus, and
a plurality of memory integrated circuit devices configured to provide a physical memory addresses accessible via the system memory bus.

6. The system of claim 4, further including:
the slave interface comprises a direct memory access (DMA) slave.

7. The system of claim 4, further including:
an input/output device coupled to the host processor via a host bus different than the system memory bus and configured to operate as the bus controller.

8. The system of claim 7, wherein:
the input/output device is configured to transfer network packet data over the system memory bus, the network packet data including a payload and a header portion.

9. The system of claim 1, further including:
an input/output memory management unit configured to translate logical read and write destinations to physical read and write destinations, the physical read and write destinations including locations of the at least one offload processor module.

10. A system, comprising:
a host processor connected to a system memory having a physical address space via a system memory bus,
at least one processor module that includes an in-line module connector configured to physically connect the processor module to at least one in-line memory slot of the system memory bus;

at least one integrated circuit device (IC) mounted on the module that includes at least one offload processor comprising a central processing unit and cache memory, at least one context memory coupled to the offload processor, and logic coupled to the offload processor and context memory and configured to detect predetermined write operations over the system memory bus to particular physical address spaces of the system memory and extract metadata from the write operations to determine a type of processing to be performed by the at least one offload processor.

11. The system of claim 10, wherein:
the in-module connector comprises a dual-in-line memory module (DIMM) connector.

12. The system of claim 10, wherein:
the at least one IC includes a first IC comprising at least one offload processor embedded with the logic.

13. The system of claim 10, wherein:
the at least one IC includes at least one programmable logic IC configured to provide at least the logic.

14. The system of claim 10, wherein:
the at least one IC includes at least one memory IC configured to function as the context memory.

15. The system of claim 14, wherein:
the at least one IC further includes a buffer memory configured to store write data received over the system memory bus, the buffer memory having a slower access time than the context memory.

16. A system, comprising:
at least one host processor coupled to a system memory bus;

an input/output device coupled to the at least one host processor via a host bus different than the system memory bus;

at least one memory module coupled to the memory bus having storage locations accessible by read and writes to first system memory physical addresses; and at least one processor module coupled to the memory bus, and not directly to a host processor, the processor module including at least one offload processor configured to process data received as memory writes to second system memory physical addresses over the system memory bus based on metadata in the memory writes to second system memory physical addresses, and a context memory configured to store processing context data of the offload processor.

17. The system of claim 16, wherein:
the at least one host processor is different than the at least one offload processor.

18. The system of claim 16, wherein:
the offload processor comprises a general purpose operating system to enable rapid switching between different processing contexts.

19. The system of claim 16, wherein:
the at least one processor module further includes a buffer memory for storing write data received over the system memory bus.

20. The system of claim 16, wherein:
the at least one memory module is physically connected to the memory bus by an in-line memory module connector; and at least one processor module is physically connected to the memory bus by at least one in-line memory module connector.

* * * * *